US008990930B2

(12) United States Patent
Burrell et al.

(10) Patent No.: US 8,990,930 B2
(45) Date of Patent: Mar. 24, 2015

(54) CODE PROPERTY ANALYSIS FOR SECURITY MITIGATIONS

(75) Inventors: Tim W. Burrell, Cheltenham (GB); Jonathan E. Caves, Bellevue, WA (US); Louis Lafreniere, Seattle, WA (US); Richard M. Shupak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1165 days.

(21) Appl. No.: 12/366,666

(22) Filed: Feb. 6, 2009

(65) Prior Publication Data

US 2010/0205673 A1     Aug. 12, 2010

(51) Int. Cl.
*G06F 11/00* (2006.01)
*G06F 21/54* (2013.01)
*G06F 21/55* (2013.01)
*G06F 21/56* (2013.01)

(52) U.S. Cl.
CPC .............. *G06F 21/54* (2013.01); *G06F 21/554* (2013.01); *G06F 21/563* (2013.01)
USPC ................................. 726/22; 726/24; 726/25

(58) Field of Classification Search
CPC ... G06F 21/577; G06F 21/54; G06F 11/0793; G06F 11/08; G06F 21/554; G06F 21/563; H04L 63/1433
USPC ...................... 726/22–25; 708/525, 530, 531; 713/187–188, 189, 193
See application file for complete search history.

(56) References Cited

U.S. PATENT DOCUMENTS

| | | | |
|---|---|---|---|
| 6,578,094 B1 | 6/2003 | Moudgill | |
| 6,993,663 B1 | 1/2006 | Paya et al. | |
| 7,181,733 B2 | 2/2007 | Sarcar | |
| 7,284,274 B1 | 10/2007 | Walls et al. | |
| 7,331,043 B2 | 2/2008 | Saulsbury | |
| 7,392,545 B1 | 6/2008 | Weber et al. | |
| 7,617,415 B1* | 11/2009 | Kadakia | 714/26 |
| 8,484,066 B2* | 7/2013 | Miller et al. | 705/7.28 |
| 2005/0273605 A1* | 12/2005 | Saha et al. | 713/166 |
| 2005/0273861 A1* | 12/2005 | Chess et al. | 726/25 |
| 2005/0283834 A1* | 12/2005 | Hall et al. | 726/24 |
| 2006/0195745 A1* | 8/2006 | Keromytis et al. | 714/741 |
| 2006/0230289 A1* | 10/2006 | Fox et al. | 713/188 |
| 2007/0083933 A1* | 4/2007 | Venkatapathy et al. | 726/25 |
| 2007/0089088 A1 | 4/2007 | Borde et al. | |
| 2007/0089092 A1 | 4/2007 | Schmidt et al. | |
| 2008/0072214 A1 | 3/2008 | Peyton et al. | |
| 2009/0125973 A1* | 5/2009 | Byers et al. | 726/1 |

OTHER PUBLICATIONS

Yang Ni et al., "Design and implementation of transactional constructs for C/C++," Sep. 2008, ACM SIGPLAN Notices, vol. 43 Issue 10.*

(Continued)

*Primary Examiner* — Nirav B Patel
(74) *Attorney, Agent, or Firm* — Timothy Churna; Sade Fashokun; Micky Minhas (57) ABSTRACT

Attempts to make code secure often are associated with performance penalties. To facilitate striking an acceptable balance between performance and security, vulnerable areas of source code are identified. The vulnerable areas are examined for areas that are actually safe and the safe areas are filtered from the universe of code that receives security mitigations. The remaining code receives security mitigations appropriate to the level of risk of the code.

18 Claims, 4 Drawing Sheets

(56) References Cited

OTHER PUBLICATIONS

Larochelle, et al.,"Statically Detecting Likely Buffer Overflow Vulnerabilities", Retrieved at<<://lclint.cs.virginia.edu/usenix01.pdf>>, pp. 13.

"Klocwork: Software Security through Source Code Analysis", Retrieved at<<http://www.klocwork.com/company/downloads/FS_Software_Security.pdf>>, pp. 2.

Whitehouse Ollie, "Analysis of GS Protections in Microsoft(R) Windows Vista", Retrieved at<<http://www.symantec.com/avcenter/reference/GS_Protections_in_Vista.pdf>>, pp. 24.

Wagle, et al."StackGuard: Simple Stack Smash Protection for GCC", Retrieved at<<http://gcc.fyxm.net/summit/2003/Stackguard.pdf>>, pp. 14.

"Uniformed", Retrieved at<<http://uninformed.org/?v=9&a=4&t=sumry>>, vol. 9» Jan. 2008, Informative Information for the Uninformed, p. 1.

Miller Matt,"State of the Exploit", Retrieved at<<http://hick.org/~mmiller/presentations/seatoorcon08/2008_seatoorcon.ppt>>, pp. 22.

Costa, et al."Detecting memory errors with write integrity testing", Filed on Mar. 28, 2008, U.S. Appl. No. 12/058,513.

* cited by examiner

CODE PROPERTY ANALYSIS FOR SECURITY MITIGATIONS

BACKGROUND

Computer security is particularly challenging because it imposes negative constraints on a computer, for example: "No buffer can be overflowed." Arguably, making a computer correctly do what it is designed to do is hard enough. In computer security, and specifically in the area of security mitigations, the problem is to prevent a computer from doing a subset of what it is (unintentionally) designed to do. This is even harder. One strategic approach to computer security is the conversion of negative requirements to positive enforceable rules, by for example, using programming strategies that make computer programs more dependable and more resistant to subversion. However, in this approach, the same developer who is responsible for introducing code defects is asked to follow various coding rules. Inevitably, in the same way that occasionally a code defect creeps in, occasionally a developer will neglect to follow one of the coding rules.

SUMMARY

Code that increases security (security mitigation code) or performs runtime validation techniques is inserted into program code based on an analysis of code properties of the program code. A software development tool can receive information from another analysis tool and/or may itself perform the analysis. Analysis can include but is not limited to analysis of variable type, analysis of variable size, alias/range analysis and other information from dynamic and/or static analysis tools. Based on a level of risk assessment, various levels of code mitigation may be inserted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

There can be a trade-off between software performance and software security. Many attempts to make code secure carry performance penalties that make it undesirable to apply them globally to a software product. It would be useful to be able to identify how widely a security mitigation or other kind of runtime validation can be applied without affecting performance to an intolerable level. Being able to identify the highest-priority places to apply the security mitigation (or other runtime check) and being able to identify places where the security mitigation (or other runtime check) does not have to be applied would be helpful to establish a balance between these competing goals.

In computer security and programming, a buffer overflow, or buffer overrun, occurs when a process attempts to store data that is larger than the fixed-length buffer which is meant to store this data. When a buffer overflow occurs, the extra data overwrites adjacent memory locations. The data that is overwritten may include other buffers, variables and/or program flow data. A buffer overflow thus may result in erratic program behavior, a memory access exception, program termination (a crash), incorrect results or, if, for example, deliberately caused by a malicious user, a security breach.

A buffer overflow can be triggered by an input that is specifically designed to execute malicious code or to make the program operate in an unauthorized way. Hence, buffer overflows cause many software vulnerabilities and form the basis of many exploits. The programming languages most commonly associated with buffer overflows are C and C++, because these languages do not provide built-in protection against accessing or overwriting data in any part of memory and do not check that data written to an array (the built-in buffer type) is within the boundaries of that array.

The current implementation of known buffer overrun security mitigation principally protects string buffers. Many other code elements exist, however, that may benefit from this security mitigation. In accordance with aspects of the subject matter described herein, placement of mitigation (or runtime validation) code is based on code properties. For example, a compiler or other software development tool may receive results from internal or external analysis including but not limited to variable type, variable size, array element count, alias/range analysis and information that relies on or results from other dynamic techniques that provide information in real time (e.g., as the developer is writing code) and static analysis techniques that analyze code after the code is written.

For example, varying levels of protection may be provided based on an evaluation of risk derived from a combination of symbol allocation size, type and structure. A mechanism such as source code annotation (for example, annotations made to source code using a declaration specification or declspec) may be used to provide this information to a software development tool such as a compiler. A software development tool such as a compiler may consume the results of external analysis that provides information concerning the usage of potentially vulnerable buffers, specifically analyzing their use in calls to known trusted functions and making use of alias and range analysis for calls to the non-trusted functions. An analytical component that provides the risk analysis information can be used independently of the compiler to automate triage of warnings generated by static analysis tools (such as but not limited to Lint or Prefast) by increasing the severity of a warning where code is determined not to be mitigated.

Code Property Analysis for Security Mitigations

Figure 1:
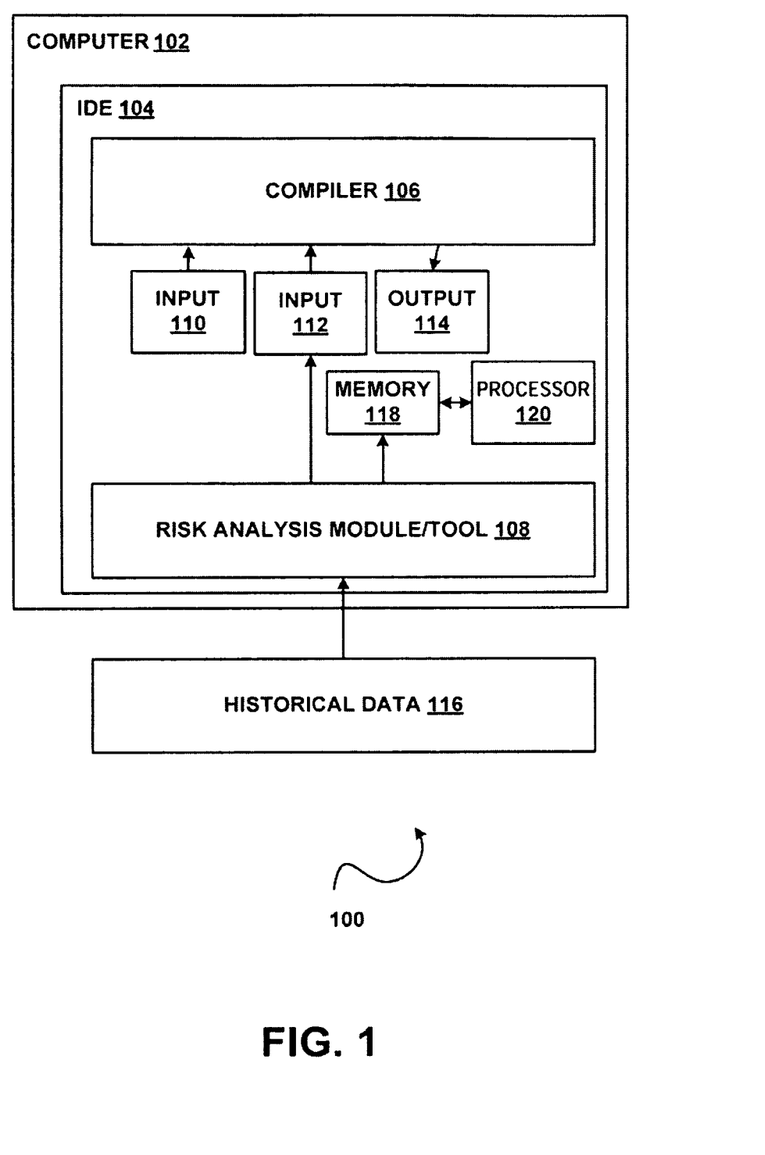
FIG. 1 is a block diagram of an example of a system for security mitigation in accordance with aspects of the subject matter disclosed herein.

FIG. 1 illustrates an example of a system 100 that mitigates security risks in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated design environment 600 (IDE) such as the ones described and illustrated below with respect to FIG. 4. Alternatively, system 100 or portions thereof may be provided as a stand-alone system or as a plug-in.

System 100 may include one or more of the following: an integrated development environment 104, historical data 116, a compiler 106, one or more processors (such as processor 120), a memory 118, a risk analysis module or tool 108 (external to compiler 106 or integrated into compiler 106 or a combination thereof), input 110, input 112 and output 114. A compiler may compile source code written in Visual Basic, Visual J#, C++. C#, J#, Java Script, APL, COBOL, Pascal, Eiffel, Haskell, ML, Oberon, Perl, Python, Scheme, Smalltalk or other programming language. A compiler such as compiler 106 typically receives source code input (e.g., input 110) and produces executable code output (e.g., output 114). Risk analysis module or tool 108 can be loaded into memory 118 and may cause one or more processors such as processor 120 to perform risk analysis as described more fully below.

Compiler 106 may include logic that improves the compiler's ability to determine whether an area of source code is vulnerable to exploitation. Compiler 106 may receive information from one or more external analysis tools. Contemplated external analysis tools may be dynamic and/or static tools. One contemplated external analysis tool is risk analysis component or risk analysis module or tool 108 that allows the compiler 106 to consume the results of external analysis to target the code to be mitigated. One contemplated means for providing vulnerability information to the compiler 106 is via source code annotations such as via a declaration specification or declspec (e.g., input 112). A new declspec (e.g., safe-buffers) may be created to provide the compiler with a mechanism for consuming the results of external analysis. The presence of the declspec or other source code annotation may override built-in compiler heuristics and/or prevent existing security mitigating code insertions from being applied. A risk analysis module or tool 108 can apply the information received via source code annotations to functions that it determines are safe and do not require the built-in mitigation. This feature allows for continuous improvement of the targeting of security mitigation without necessarily requiring further changes to the compiler itself by simply adding the source code annotation to additional functions.

A risk analysis module or tool 108 may identify areas of source code that are vulnerable, optionally classify or categorize the degree of risk of the identified vulnerable areas of source code, filter out areas identified as vulnerable that do not need security mitigation code insertion and determine, based on category of risk, what level of security mitigation code will be inserted into the code generated from the source code that remains after the filtering out of the areas of code that do not need security mitigation. The risk analysis module or tool 108 may not be limited by the same constraints as the compiler 106: notably it may be able to perform computationally-intensive tasks that would be impractical for the compiler 106 to carry out itself, and provide results of those tasks to the compiler 106. The risk analysis module or tool 108 may provide this information to the compiler 106 via source code annotations such as but not limited to the above-described declspec. In response, the compiler 106 may optionally insert into source code or generated code the security mitigation code or may insert different levels of mitigating code depending on the determined category of risk. The risk analysis module or tool 108 may directly insert the security mitigation code into the source code or generated code, may override insertion of the security mitigation code by the compiler 106 by adding the source code annotations to the source code or may pass the source code annotations to the compiler 106 and the compiler 106 may add the source code annotations to the source code.

Figure 2:
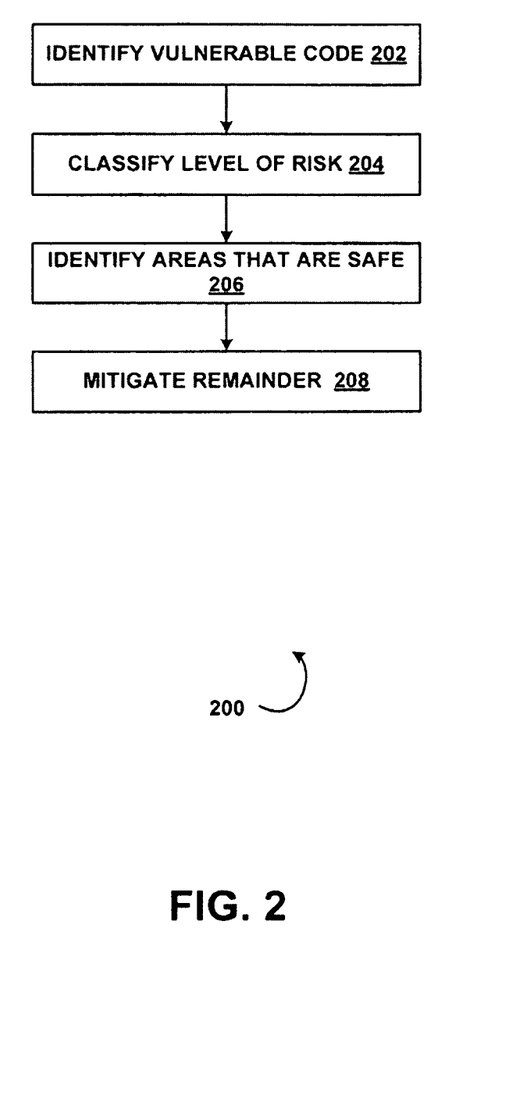
FIG. 2 is a flow diagram of a method for security mitigation in accordance with aspects of the subject matter disclosed herein.

FIG. 2 illustrates a method 200 for inserting security mitigations into source code in accordance with aspects of the subject matter disclosed herein. At 202 areas of source code that are at risk for unauthorized exploitation (hacking) are identified. At risk areas of code may be identified by examination of historical data (e.g., historical data 116 of FIG. 1) to find places in source code that have been exploited, and/or to determine where security mitigation code is currently not present. A heuristic can be used to automate finding at risk areas of code.

Variables that are potentially vulnerable to attack may be identified based on variable type, storage class, allocation size, and by using other structure and code analysis techniques. Source code vulnerability may be based on any combination of:
    the allocation size of a local variable symbol;
    for an array, the size of the array element type;
    for an array, the array element type; or
    for a structure, a detailed analysis of the makeup of the structure wherein structures including vulnerable arrays and pure data structures are protected.
In accordance with example embodiments, the following areas may be protected:
    Any array where the element type is not of pointer type and the allocation size of the array is greater than 4 bytes is considered potentially vulnerable. A standalone array for which the element count is greater than two is considered potentially vulnerable (where, e.g., a standalone array is an array that is not contained within a structure).
    Any structure containing an array is considered potentially vulnerable.
    Any structure containing a member that is itself a potentially vulnerable structure is considered potentially vulnerable.
    Any structure that has no members of pointer type is considered potentially vulnerable as long as its allocation size is greater than 8 bytes.
Optionally, identified areas of source code and identified variables may be classified into categories of risk (e.g., high risk, medium risk, low risk and no risk or other risk classification system) at 204. Varying levels of code protection may be inserted in an area of code based on the risk classification level of the area of source code. Risk determinations may be based on a combination of symbol allocation size, type and structure. At 206, areas within the identified areas are examined to determine if some of those areas do not need insertion of security mitigating code, that is, to identify areas that are safe. The universe of vulnerable source code is filtered to remove the areas that have been identified as not needing security mitigation code insertion, thereby creating a remaining subset of source code that will be mitigated.

Areas within the identified areas of vulnerable source code may be filtered out based on the following determinations.
    Where a potentially vulnerable local variable is used as a parameter to a known trusted function, other parameters in that function call may be analyzed to determine whether this function call (and hence this usage of the potentially vulnerable local variable) is safe. Example safe uses include but are not limited to:
        The potentially vulnerable local variable is an input parameter to the trusted function (and thus will not be written to, let alone overflowed).
        The potentially vulnerable local variable is a parameter to which the trusted function writes a maximum amount of data that is strictly less than the allocation size associated with the local variable.

The combination of parameters in the trusted function call is such that the previous bullet holds; for example a StringCchCopy( ) function call will not overflow the destination buffer parameter if the destination buffer size parameter is set correctly. This can often be determined statically.

Intra- and/or inter-procedural range analysis may be used to determine that local writes to the potentially vulnerable local variable are safe. Intra-procedural range analysis may track parameter usage so that functions can be determined to be trusted functions, wherein trusted functions do not need security mitigation. Intra- and/or inter-procedural range analysis may be performed offline and the results of the analysis may be passed to and consumed by the compiler via the declspec (e.g., safebuffers) mechanism. Alternatively, the intra-procedural range analysis may be incorporated into the compiler. The intra-procedural analysis may also summarize the effect of a function on its parameters. This summary information may then form the basis of an inter-procedural analysis where calling functions access the summary information of their callees in order to determine whether usage of a given local variable is safe or not safe for a given call.

At 208 the remaining subset of source code may be transformed by insertion of the security mitigation source code into the source code or into code generated from the source code. As described above, insertion of the security mitigation source code may be performed by a compiler, a risk analysis module or tool or by a combination thereof. The severity of warnings generated by static analysis tools may be increased where code is determined not to be mitigated.

Example of a Suitable Computing Environment

Figure 3:
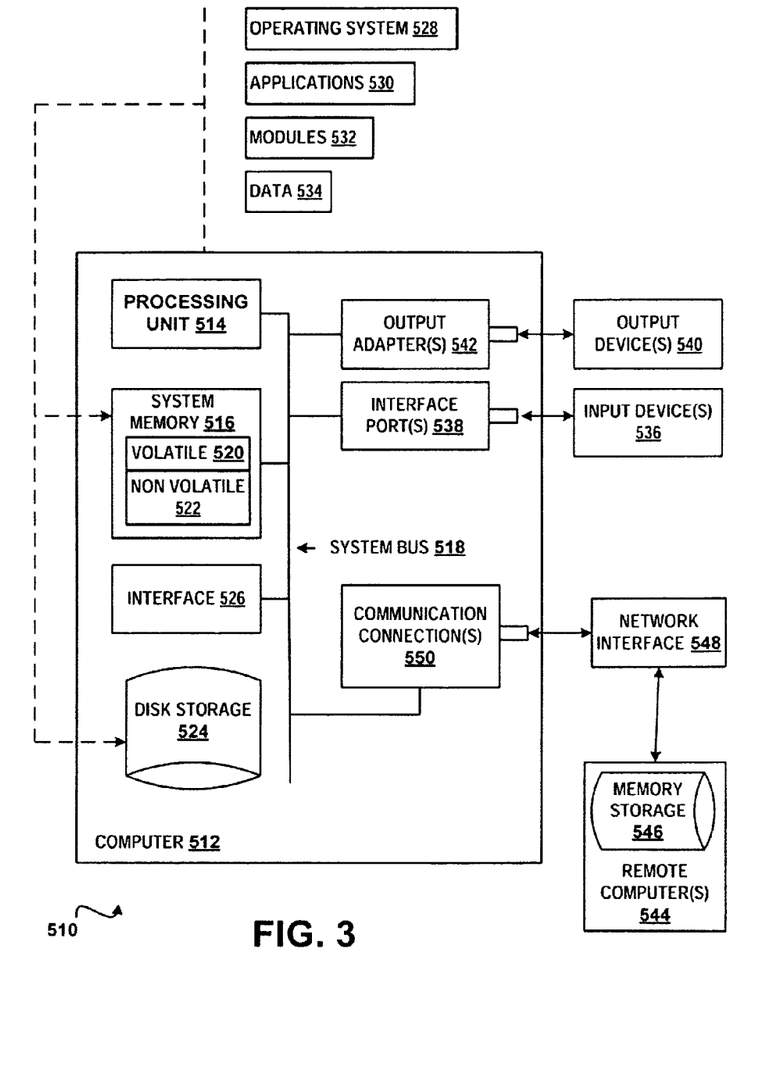
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for low privilege debugging in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
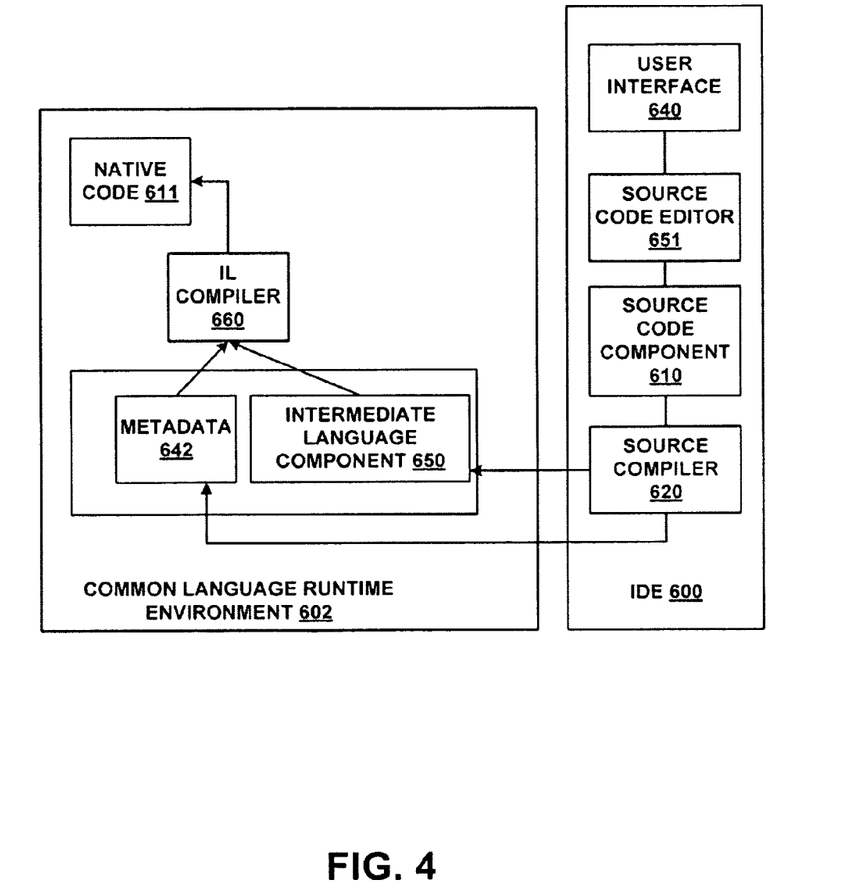
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system for mitigating security risks in computer program code comprising:
a processor and a memory including a risk analysis module configured to cause the processor to:
identify vulnerable areas of a source code, wherein the vulnerable areas of the source code are vulnerable to unauthorized exploitation;
identify safe areas of the source code within the vulnerable areas of the source code for which security mitigation code will not be inserted;
filter out the safe areas of the source code within the vulnerable areas of the source code for which the security mitigation code will not be inserted;
identify a subset of the vulnerable areas of the source code that excludes the safe areas of the source code;
determine a level of risk based on a combination of allocation size of a symbol, type of the symbol and structure of the symbol in the subset of the vulnerable areas of the source code in order to provide a variable level of code protection;
insert the security mitigation code into the subset of the vulnerable areas of the source code that excludes the safe areas of the source code to provide the variable level of code protection, wherein the variable level of code protection is ascertained solely for the subset of the vulnerable areas of the source code according to the determined risk level associated with the subset of the vulnerable areas of the source code; and
execute the source code with the security mitigation code inserted into the subset of the vulnerable areas of the source code that excludes the safe areas of the source code.

2. The system of claim 1, wherein the risk analysis module is external to a compiler.

3. The system of claim 1, wherein the risk analysis module is static.

4. The system of claim 1, wherein the risk analysis module is configured to override built-in compiler heuristics that determine the vulnerable areas of the source code.

5. The system of claim 1, wherein the risk analysis module is configured to cause a compiler to categorize the subset of the vulnerable areas of the source code into categories of degrees of risk, wherein the variable level of code protection is provided based on a degree of risk category into which the subset of the vulnerable areas of the source code has been categorized.

6. The system of claim 1, wherein the risk analysis module is configured to cause a compiler to categorize the vulnerable areas of the source code
  based on an allocation size of a local variable symbol;
  based on a size of an array element;
  based on an array element type;
  based on an element count of an array;
  based on an analysis of a structure, wherein the structure comprises an array; or
  based on an analysis of a structure, wherein the structure is a pure data structure.

7. A method of performing security mitigations comprising:
  identifying vulnerable areas of a source code, wherein the vulnerable areas of the source code are vulnerable to unauthorized exploitation, and wherein the vulnerable areas of the source code are identified via a risk analysis module executing on a software development computer;
  identifying safe areas of the source code within the vulnerable areas of the source code;
  filtering out the safe areas of the source code from the vulnerable areas of the source code for which insertion of a security mitigating code will not be done to create a subset of the vulnerable areas of the source code that excludes the safe areas of the source code for which insertion of the security mitigating code will be done;
  determining a level of risk based on a combination of allocation size of a symbol, type of the symbol and structure of the symbol in the subset of the vulnerable areas of the source code in order to provide a variable level of code protection;
  inserting the security mitigating code into the subset of the vulnerable areas of the source code that excludes the safe areas of the source code to provide the variable level of code protection, wherein the variable level of code protection is ascertained solely for the subset of the vulnerable areas of the source code according to the determined risk level associated with the subset of the vulnerable areas of the source code; and
  executing the source code with the security mitigating code inserted into the subset of the vulnerable areas of the source code that excludes the safe areas of the source code;
  wherein the preceding steps are performed by at least one processor.

8. The method of claim 7, wherein the identifying comprises examining historical data to find areas in the source code that have been exploited or comprises utilizing an automated heuristic that determines where in the source code security mitigation code is currently not present.

9. The method of claim 7, wherein the inserting of the security mitigating code comprises classifying the subset of the vulnerable areas of the source code into categories of risk and inserting the variable level of code protection based on a risk classification category.

10. The method of claim 7,
  wherein the safe areas of the source code comprise an area where a potentially vulnerable local variable is used as a parameter to a known trusted function, and
  wherein other parameters in a call to the known trusted function are analyzed to determine that the call is safe.

11. The method of claim 7,
  wherein the safe areas of the source code is determined by analysis of intra- or inter-procedural ranges, and
  wherein the analysis comprises determining that local writes to a local variable are safe or comprises determining that functions are safe by tracking parameter usage.

12. The method of claim 7, further comprising:
  classifying identified areas of source code into categories of levels of risk and applying varying levels of code protection based on the risk level of the identified area of source code.

13. A computer-readable storage memory comprising computer-executable instructions which when executed cause at least one processor to:
  identify vulnerable areas of source code, wherein the vulnerable areas of source code are vulnerable to unauthorized exploitation;
  identify safe areas of the source code within the vulnerable areas of source code;
  filter out safe areas of the source code from the vulnerable areas of source code for which insertion of security mitigating code will not be done to create a subset of the vulnerable areas of source code that excludes the safe areas of the source code;
  determine a level of risk based on a combination of allocation size of a symbol, type of the symbol and structure of the symbol in the subset of the vulnerable areas of source code in order to provide a variable level of code protection;
  insert the security mitigating code into the subset of the vulnerable areas of source code that excludes the safe areas of the source code to provide the variable level of code protection, wherein the variable level of code protection is ascertained solely for the subset of the vulnerable areas of source code according to the determined risk level associated with the subset of the vulnerable areas of source code; and
  execute the source code with the security mitigating code inserted into the subset of the vulnerable areas of source code that excludes the safe areas of the source code.

14. The computer-readable storage memory of claim 13, comprising further computer-executable instructions, which when executed cause the at least one processor to:
  inform a compiler of a safe area of the safe areas by a source code annotation, wherein the source code annotation overrides built-in compiler heuristics and prevents existing security mitigating code insertions from being applied to the safe area.

15. The computer-readable storage memory of claim 13, comprising further computer-executable instructions, which when executed cause the at least one processor to:
  inform a compiler of a safe area of the safe areas by a source code annotation comprising a declaration specification.

16. The computer-readable storage memory of claim 13, comprising further computer-executable instructions, which when executed cause the at least one processor to:
  classify an identified area of source code into a level of risk based on an evaluation of a combination of symbol allocation size, type and structure.

17. The computer-readable storage memory of claim 13, comprising further computer-executable instructions, which when executed cause the at least one processor to:
  increase severity of a warning generated by a static analysis tool where identified source code is determined not to be mitigated.

18. The computer-readable storage memory of claim 13, comprising further computer-executable instructions, which when executed cause the at least one processor to:
  identify an area of source code that is vulnerable to unauthorized exploitation by examination of:
    an allocation size of a local variable symbol;
    for an array, a size of an element of the array;
    for an array, an array element count of the array;

for an array, an array element type of the array; or for a structure, an analysis of the structure wherein structures including vulnerable arrays and pure data structures are protected by insertion of mitigating code.

* * * * *